US008768715B2

(12) United States Patent
Penick

(10) Patent No.: US 8,768,715 B2
(45) Date of Patent: Jul. 1, 2014

(54) SYSTEM AND METHOD FOR RESOURCE MANAGEMENT

(75) Inventor: David Penick, Austin, TX (US)

(73) Assignee: Oracle America, Inc., Redwood City, CA (US)

( * ) Notice: Subject to any disclaimer, the term of this patent is extended or adjusted under 35 U.S.C. 154(b) by 4571 days.

(21) Appl. No.: 10/319,801

(22) Filed: Dec. 13, 2002

(65) Prior Publication Data

US 2003/0145074 A1 Jul. 31, 2003

Related U.S. Application Data

(60) Provisional application No. 60/341,516, filed on Dec. 13, 2001.

(51) Int. Cl.
*G06Q 10/00* (2012.01)

(52) U.S. Cl.
USPC ........................................... 705/1.1; 709/223

(58) Field of Classification Search
USPC .......................................... 709/223; 705/1.1
See application file for complete search history.

(56) References Cited

U.S. PATENT DOCUMENTS

| | | | |
|---|---|---|---|
| 5,835,765 | A | 11/1998 | Matsumoto |
| 6,016,478 | A | 1/2000 | Zhang et al. |
| 6,189,000 | B1 | 2/2001 | Gwertzman et al. |
| 6,321,264 | B1 | 11/2001 | Fletcher et al. |
| 6,377,950 | B1 | 4/2002 | Peters et al. |
| 6,578,069 | B1 | 6/2003 | Hopmann et al. |
| 6,766,368 | B1 | 7/2004 | Jakobson et al. |
| 6,799,208 | B1 | 9/2004 | Sankaranarayan et al. |
| 7,051,071 | B2 * | 5/2006 | Stewart et al. ................ 709/204 |

OTHER PUBLICATIONS

Amy LaMeyer, et al., "On Designing a Database for Integrated User Management: Pitfalls and Possibilities," 2000, 12 pages.
Remote Procedure Call http://en.wikipedia.org/wiki/remote_procedure_call (1 page).
Fink, J., "Institute White Pages as a System Administration Problem", Proceedings of the Tenth Systems Administration Conference (Lisa '96) Proceedings of the 10th Unsenix Systems administration Conference (Lisa '96), Chicago, IL, USA, Sep. 1996.
La Meyer et al., "On Designing a Database for Integrated Use Managemet: Pitfalls and Possibilities", Boston University 'Online!', retrieved from www.usenix.org/events/lisa-nt2/000/lameyer.pdf, (4 sheets), Aug. 2000.

(Continued)

*Primary Examiner* — Kira Nguyen
(74) *Attorney, Agent, or Firm* — Robert C. Kowert; Meyertons, Hood, Kivlin, Kowert & Goetzel, P.C.

(57) ABSTRACT

Embodiments of the present invention provide a system and method of managing information objects on a resource that substantially eliminate or reduce disadvantages associated with previously developed systems and methods of resource management. More particularly, embodiments of the present invention provide a system and method for of resource management that reduces dependence on local agents to perform management tasks. One embodiment of the present invention can include a method for resource management comprising (i) communicating with a resource program over a network according to said resource program's software interface; (ii) generating a resource management command remote from said resource to perform a management task; and (iii) communicating said resource management command over said network to said resource in accordance with said resource program's software interface to manage an information object at said resource.

48 Claims, 6 Drawing Sheets

(56) References Cited

OTHER PUBLICATIONS

Arbee et al.,"Schema Ontegration and Query Processing for Multiple Object Databases", National Tsing Hua University, 'Online!, (pp. 1-27), retrieved from www.citseer.nj.nec.com/chen95schema/html, on Jun. 24, 2003.

Parent et al., "Issues and Approaches of Database Integration", Communications of the Association for Computing Machinery, Association for Computing Machinery, vol. 41, No. 5, (pp. 166-178), 1998.

Gamal-Eldin, et al., "Integrating Relational Databases with Support for Updates", CH2665-8/88/0000/0202$01, (pp. 202-209), Dec. 5, 1998.

International Search Report mailed Jan. 18, 2005, PCT/US02/39908.

* cited by examiner

SYSTEM AND METHOD FOR RESOURCE MANAGEMENT

RELATED APPLICATIONS

This application claims priority under 35 U.S.C. §119(e) to U.S. Provisional Patent Application Ser. No. 60/341,516, entitled "System and Method for Agent-Less Provisioning," filed on Dec. 13, 2001, which is hereby fully incorporated by reference.

TECHNICAL FIELD OF THE INVENTION

The present invention relates generally to systems and methods for resource management. More particularly, the present invention relates to a system and method for managing distributed information objects. Even more particularly, embodiments of the present invention relate to a system and method for managing user account information minimizing the use of agents.

BACKGROUND OF THE INVENTION

In the early 90's, as client/server computing was readying for mainstream, the challenges of managing a distributed computing environment were initially answered through a structured management-framework approach. This involved deploying an agent-server infrastructure that mirrored the managed client/server environment. The need for a remote procedure call mechanism, secure connection management, a messaging infrastructures and a "run anywhere" user interface, led to heavy-weight solutions based on CORBA or "CORBA-like" architectures that had a dependence on local agent technology.

FIG. 1 illustrates one example of a prior art system 100 relying on local agent technology. In system 100, one or more resource servers 110 run resource programs 115, such as an email program 115, that contains multiple user accounts 118. Each resource program 115 provides an interface 120 so that user accounts 118 can be managed (e.g., created, deleted, etc.). In prior aft system 100, to remotely manage user accounts 118, a centralized management program 130, hosted on management server 135, can make a call to local agents 140 to initiate a management task. Each local agent 140 can then interface with the respective resource program 115 through interface 120, generate one or more management commands, and issue the management commands to resource program 115 in accordance with interface 120, thereby managing user accounts 118. Thus, the local agents are essentially a portion of centralized management program 130.

As products developed and functionality was added to the resources, the dependence, complexity and general "weight" of the agents (such as local agent 140) has continued to grow. Today's tool vendors have continued to build products with specific features and functionality built around the underlying assumption that the agent would be everywhere. This profoundly impacted the evolution of systems and security management software. Many prior art systems now have a total functional dependence on local agents, regardless of their benefit to the management task at hand.

Prior art systems, such as that of FIG. 1, suffer several deficiencies for managing resources, not the least of which is that agent architectures add a high degree of complexity to the overall deployment and ongoing maintenance of a management solution. The following outlines some of the more significant shortcomings of prior art management solutions, broken down into two categories: initial deployment, and ongoing management and maintenance.

The first problem encountered with an agent-dependent architecture is typically initial deployment. Often, simply getting the local agent deployed and running on the local hosts proves to be a significant challenge. The logistics of installing a software component on highly sensitive resources are substantial. Moreover, introduction of agents across departmental, divisional and organizational boundaries, can cause a company implementing an agent architecture considerable difficulties.

Consider the physical installation process. Can the agents be installed remotely? If so, does corporate security policy allow this to happen? Installation will likely require the use of a high-level systems user account an require an extensive amount of time on the part of systems administrators to implement. Moreover, if the agent installation process requires re-booting of the host, deploying agents to mission-critical, high-availability systems can be a significant challenge. Consider volume. If you have 1,000 systems under management, that means 1,000 separate agents—each one of which must be individually deployed. The introduction of 1,000 new remote software components often requires the re-testing of the systems and applications running on the machines on which the agents are installed. Software conflicts and general incompatibilities are commonplace and it is difficult to predict with any degree of certainty what effect a permanently running executable will have on the host system or applications running thereon.

Once the agents have been deployed, the next challenge with prior art systems arises from ongoing management and maintenance. How many agents do you then have running on any given system? How do you track agent status, version and availability across the environment? What happens when an upgrade to an agent or host platform occurs, will everything still work? In light of these issues, the management and maintenance of the management layer itself often becomes a greater challenge than the original problem it was put there to solve.

SUMMARY OF THE INVENTION

Embodiments of the present invention provide a system and method of managing information objects on a resource that substantially eliminate or reduce disadvantages associated with previously developed systems and methods of resource management. More particularly, embodiments of the present invention provide a system and method for resource management that reduces dependence on local agents to perform management tasks. One embodiment of the present invention can include management system having a management computer processor, a management computer network communications device in communication with a network electrically connected to said management computer processor, a management computer-readable memory electrically connected to said management computer processor and a resource management program stored on said management computer memory, executable by said management computer processor to: (i) communicate with a resource according to the software interface for the resource; (ii) generate a management command; and (iii) communicate the management command to the resource over a network in accordance with the software interface for the resource. In one embodiment of the present invention, the management program can invoke an instance of a resource adapter to communicate with and manage a resource. In this manner, embodiments of the present invention can manage remote resources without a software agent installed at the remote resource.

Another embodiment of the present invention can comprise a tiered architecture comprising a management system having a management computer processor, a management computer network communications device electrically connected to said management computer processor, in communication with a network, a management computer-readable memory electrically connected to said management computer processor and a resource management program stored on said management computer memory, executable by said management computer processor to: (i) communicate with a gateway management program according to the software interface for the resource and (ii) communicate a management call and a set of configuration information for the target resource to the gateway management program. The gateway management program can be further executable by a gateway computer processor to: (i) communicate with a target resource according to the software interface for the resource; (ii) generate a management command; and (iii) communicate the management command to the target resource over a network in accordance with the software interface for the target resource.

Yet another embodiment of the present invention can include a method for resource management comprising: (i) communicating with a resource program over a network according to said resource program's software interface; (ii) generating a resource management command remote from said resource to perform a management task; and (iii) communicating said resource management command over said network to said resource in accordance with said resource program's software interface to manage an information object at said resource.

An additional embodiment of the present invention can include a method of resource management comprising: (i) receiving a prompt to initiate a management task over a network; (ii) receiving a set of resource configuration information over said network; (iii) communicating with a resource program over said network according to said resource program's software interface and said set of resource configuration information; (iv) generating a resource management command to perform said management task; and (v) communicating said resource management command over said network to said resource computer in accordance with said resource program's software interface to manage an information object on said resource.

Embodiments of the present invention provide an advantage over previous systems and methods of resource management by eliminating, or at least substantially reducing, the number of software agents that must be deployed on the managed resource. Because the number of executable programs deployed on a system is reduced, embodiments of the present invention provide an additional advantage by increasing the overall stability of the system.

Embodiments of the present invention provide another advantage over previous systems and methods of resource management by reducing the time requirements for deployment of the initial program and deployment of updates.

Embodiments of the present invention provide yet another advantage over previous systems and methods of resource management by reducing the costs associated with large-scale deployment and operation of a cross-platform management solution.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein.

DETAILED DESCRIPTION OF THE DISCLOSURE

Preferred embodiments of the present invention are illustrated in the FIGUREs like numerals being used to refer to like an corresponding parts of the various drawings.

Embodiments of present invention provide a system and method to manage resources with decreased dependence on local agent technology. Embodiments of the present invention can leverage software interfaces at managed resources to carryout management tasks over a network, generally without the use of local agents. This provides advantages over prior art systems by reducing the number of executable programs that must be deployed on a system, thereby increasing overall system stability and substantially cutting deployment time. Moreover, since management can be carried out by a centralized management program, in one embodiment of the present invention, fewer programs must be updated when new functionality is added to one or more of the managed resources. For the purposes of this application, the term "resource" can mean a system or application accessible via a network that defines information objects related to its management or operation. For example, a Unix system can be a resource that defines accounts (i.e., information objects), typically in its /etc/passwd file, a Windows system can be a resource that defines user accounts in its Security Accounts Manager ("SAM") database, and a DBMS system can be a resource that defines user accounts in special table or tables. It should be noted that the term resource can comprise a resource computer system (distributed or undistributed) and/or application on that computer system. A "user" can be a human, a programmatic or a computer system that uses the resources. An "information object" can be a collection of one or more pieces of data that can represent a single entity or identity. In other words, an information object can represent a resources "view" of an entity, such as a user, printer, email group, etc. A resource-specific attribute can be a single piece of information on a resource (e.g., an attribute with a name, a data type and zero, one or more values) that constitutes at least part of an information object on that resource. A "schema" can be the structure of and relationships between classes of information objects on a resource, including the set of data items (attributes) the resource defines to describe each information object. A "management command" is an instruction to a resource to perform a function. Examples of management commands include, but are not limited to, requests for information regarding information objects, requests to update information objects and other instructions that would be understood by a resource. A "virtual identity" can be a composite identity of an entity based on one or more information objects stored on one or more resources.

Figure 2:
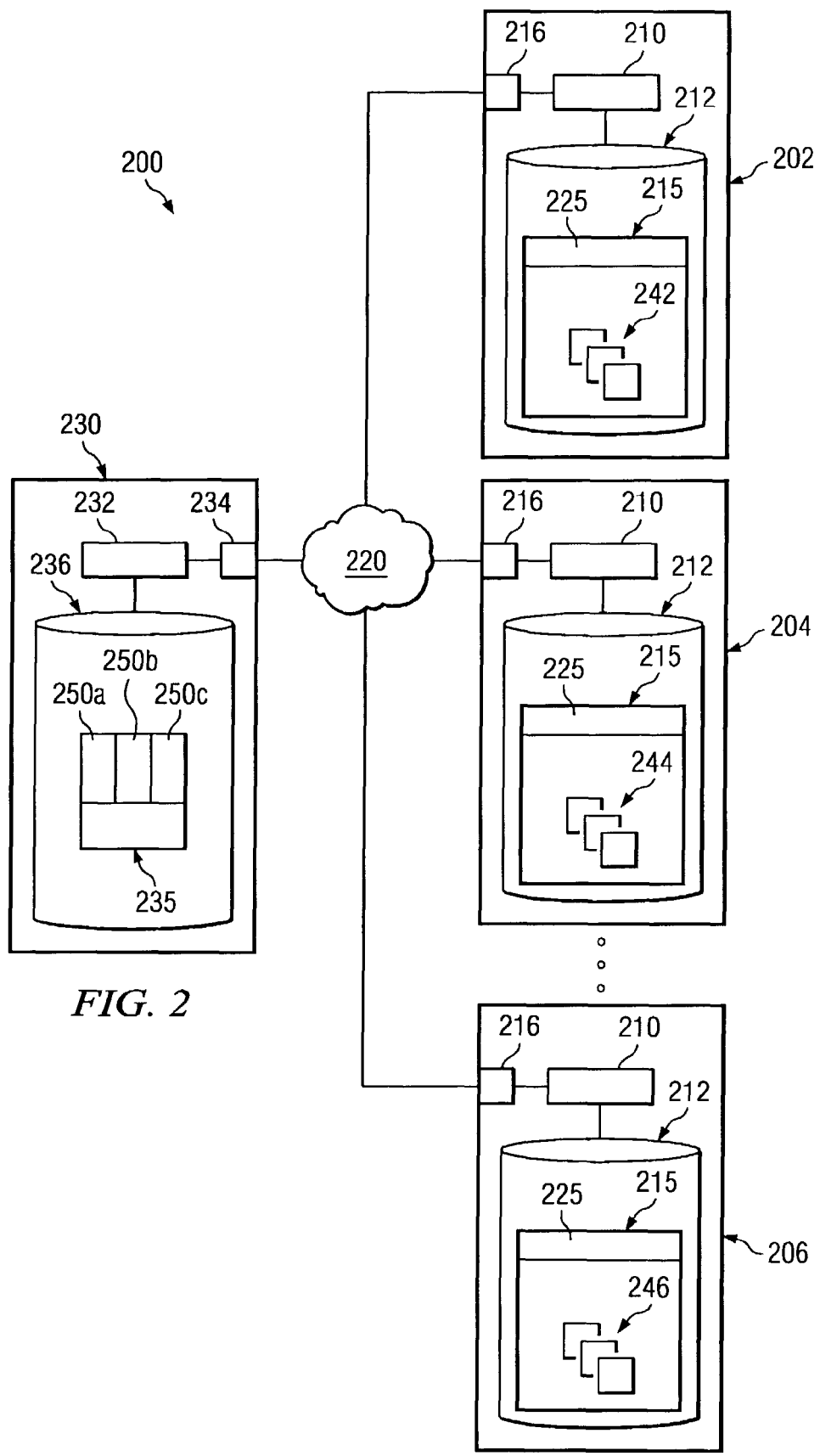
FIG. 2 is a diagrammatic representation of an embodiment of a system for resource management according to one embodiment of the present invention.

FIG. 2 illustrates a system 200 in which one embodiment of the present invention can be implemented. System 200 can comprise a plurality of resources (here, indicated as resource 202, resource 204 and resource 206. Each resource can comprise a resource computer having a resource computer processor 210, a resource computer-readable memory 212 (e.g., RAM, ROM, magnetic storage device, optical storage device and/or any other computer-readable memory known in the art) storing a resource program 215 and a resource network adapter 216 (e.g., modem, Ethernet card or any other network communications device known in the art) operable to connect to network 220, which can comprise a LAN, WAN, global communications network (e.g., Internet, wireless network, fiber channel network) or any other communications network known in the art. Resource program 215 can have a software interface 225, which in one embodiment of the present invention can support a standards-based interface, such as the Open Database Connectivity/JAVA Database Connectivity (ODBC/JDBC) protocols, Secure Shell (SSH), Lightweight Directory Access Protocol (LDAP), Simple Object Access Protocol, Telnet and other such software interface known in the art.

It should be noted that while FIG. 2 depicts a single resource program 215 on a particular resource computer, multiple resource programs can be hosted on the same computer. In other words, multiple resources can utilize the same computer to run different resource programs. Moreover, the resource computers, while shown as a single physical unit in FIG. 2, can be distributed.

Each resource can define information objects related to the management or configuration of the associated resource. By way of example, resource 202 can comprise an Oracle database system 202 including employee records 242 as information objects, resource 204 can comprise a Unix system 204 containing a set of Unix user accounts 244 and resource 206 can comprise an LDAP system 206 defining a set of user email accounts 246. Other examples of resources include SQL databases, mainframes, Windows®NT domains, Windows® Active Directories and other resources known to those of ordinary skill in the art. The resource accounts (i.e. information objects) represent each resource's view of a particular user or entity. In other words, each resource account (and the resource-specific attributes that make up that account) can represent a user within the scope of that resource. While user accounts have been presented as examples of information objects, it should be noted that resource systems can define any managed entity, such as printers, email groups, router tables or other entities with information objects having attributes.

System 200 can also include a management system 230 comprising a management computer processor 232, a management network communications device 234 (e.g., modem, Ethernet card or any other network communications device known in the art) operable to connect to network 220, and a management program 235 stored on computer readable memory 236 (e.g., RAM, ROM, magnetic storage device, optical storage device and/or any other computer-readable memory known in the art). As with resources 202-206, management system 230 can comprise a single physical unit or be distributed over multiple computers.

To manage the resources of system 200, one embodiment of management program 235 can invoke an instance of a resource adapter 250 (such as resource adapter 250a, 250b or 250c) to issue one or more commands to a resource. One resource adapter 250 is typically operable to communicate with a particular resource type with an instance of that adapter being invoked when management program 235 issues a management command to a resource of the associated resource type. In system 200, for example, management program 235 can invoke an instance of resource adapter 250a to communicate with Oracle database systems (e.g., resource 202), an instance of resource adapter 250b to communicate with Unix systems (e.g., resource 204) and an instance of resource adapter 250c to communicate with LDAP directories (e.g., resource 206). In other embodiments of the present invention, however, separate resource adapters can be used for each resource rather than for each resource type or a single resource adapter can be associated with multiple resources.

In one embodiment of the present invention, an instance of resource adapter 250 can communicate management commands to a resource in accordance with the software interface for that resource. In other words, management program 235 communicates management commands over network 220 using a protocol compatible with the software interface 225 of the resource program and in a format that can be processed by the resource program 215. As an example of system 200 in operation, if resource 202 is an Oracle Database system supporting ODBC/JDBC, an instance of resource adapter 250a can generate and communicate management commands to resource 202 in accordance with ODBC/JDBC. In this manner, management program 235 can manage user accounts on the remote Oracle system 202 without having an agent installed on Oracle system 202. Consequently, embodiments of the present invention can obviate the need that a local agent be installed at the resource by leveraging software interfaces that support remote invocation to perform management tasks remotely. In other words, embodiments of the present invention can perform resource management tasks without a portion of the management program installed on the resource by leveraging the software interface of the resource.

In some cases, however, resource program 215 may not present a software interface 225 that has a true client API such as ODBC/JDBC, but will present some other form of remote invocation interface. An example is a "legacy" web application utilizing HTTP/HTML. In such a case, the instance of resource adapter 250 can communicate with the resource using protocols such as HTML and HTTP. Thus, an instance of resource adapter 250 running remotely from a resource can access a resource and communicate management commands to that resource in accordance with the interface of that resource (e.g. by mimicking a browser or other remote access program) even without a true client API.

Figure 3:
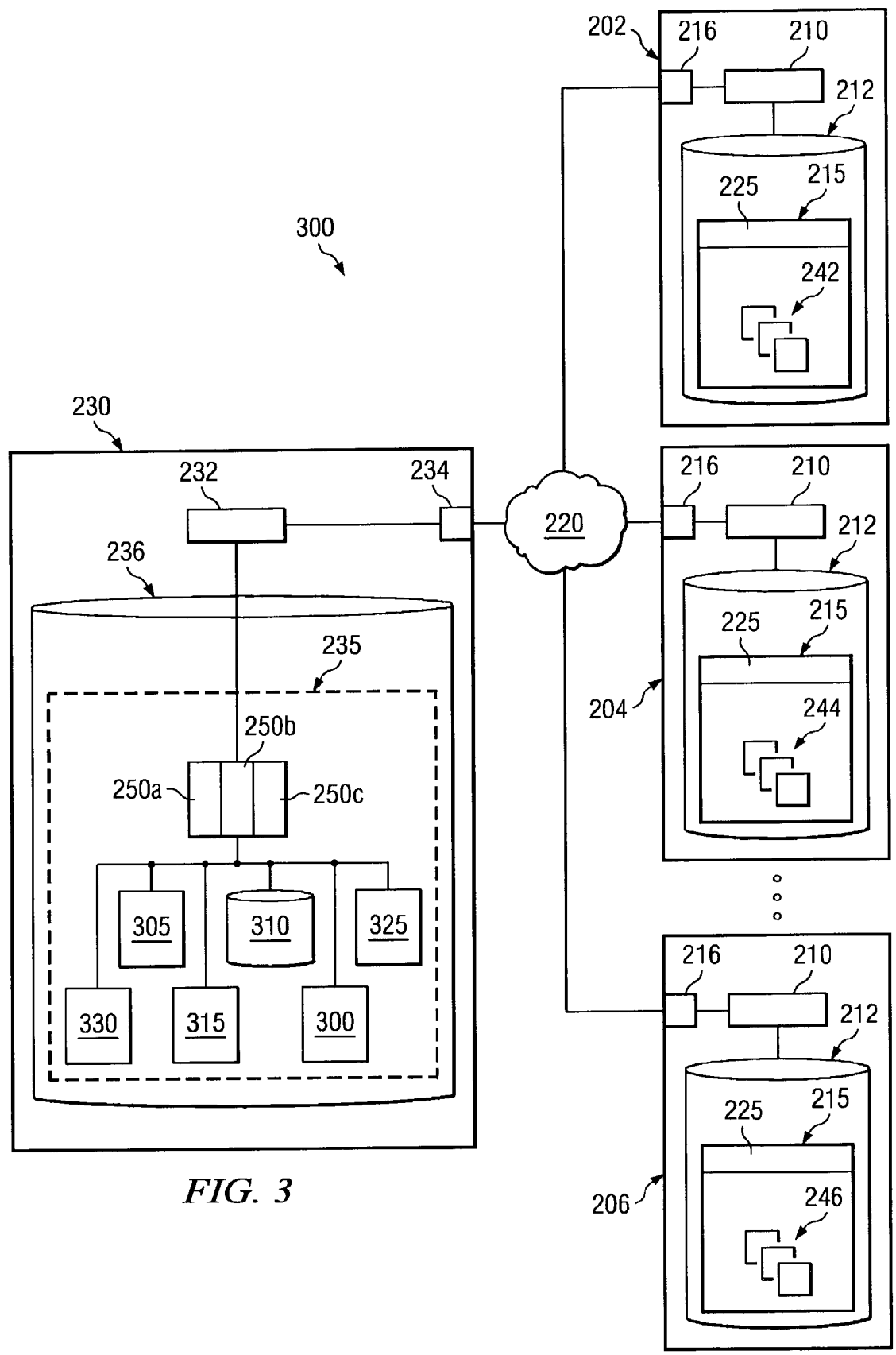
FIG. 3 is a diagrammatic representation of one embodiment of a system for resource management according to another embodiment of the present invention.

FIG. 3 is a diagrammatic representation of a system 300 in which one embodiment of management program 235 can be implemented to manage user accounts. In system 300, management program 235 can comprise one or more components including one or more resource adapters 250 (e.g., resource adapter 250a, resource adapter 250b and resource adapter 250c), a provisioning engine 305, a configuration repository 310, a logging component 315, a tracing component 320, a user interface 325, and an authentication component 330. While each of these components is shown separately, they can each constitute portions of the same code (broken into modules or not), separate objects in a code or be programmed in any other manner known in the art, each executable by management processor 232 (or a distributed system).

In one embodiment of the present invention, provisioning engine 305 can drive invocation of resource adapter 250 to manage a resource based on user input (e.g. through user interface 325), a predetermined schedule and/or other prompts. In general, when an instance of resource adapter 250 is invoked, typically based on a management call from provisioning engine 305, the instance of resource adapter 250 can load a set of resource attributes (a "Resource Object") containing information necessary to connect to a resource and, in some instances, a set of account attributes (a "User Object") to access a specific account on that resource. This information, in one embodiment of the present invention, can be stored in configuration repository 310 and can vary depending on the type of resources and accounts that the resource adapter 250 manages.

The resource attributes can include the following types of information: how the adapter will communicate with the resource, including such things as host name, port number, authentication information, passwords, URL, database names, etc; the policies associated with the resource for things such as passwords and account ID's; the defaults associated with the resource and a schema mapping for the resource. The account attributes, on the other hand, can be virtual attributes representing resource-specific attributes (and other attributes) at management system 230. For example, for a user Jane Doe, configuration repository 310 can include an account name jdoe for Jane Doe's Unix account. This can represent the resource-specific account name attribute jdoe at Unix system 204. In some cases simple matching and/or knowledge of a resource's schema can be used to relate an account attribute to a resource attribute; in other cases the schema map, discussed in greater detail in conjunction with FIG. 5, can map account attributes to resource-specific attributes.

In one embodiment of the present invention, provisioning engine 305 can invoke one instance of resource adapter 250 for each management task. In order to allow multiple requests outstanding to a single resource, provisioning engine 305 can use multiple threads to create an instance of resource adapter 250 per thread. For example, to perform four management tasks on resource 202, provisioning engine 305 can call four instances of resource adapter 250a. In this embodiment of the present invention, although resource adapter 250 does not need to be thread-safe, there may be multiple instances of a resource adapter 250 (e.g., resource adapter 250a) running at the same time on different threads and attempting to manage accounts on the same resource. In order to coordinate this process, provisioning engine 305 can synchronize the instances of resource adapter 250. In another embodiment of the present invention, a single instance of resource adapter 250 can be configured to handle multiple management tasks.

Continuing with the example of managing user accounts, examples of management tasks that can be implemented by one or more instances of resource adapter 250 include: checkCreateAccount, createAccount, createAccounts, checkUpdateaccount, updateAccount, updateAccounts, checkDeleteAccount, deleteAccount, deleteAccounts, GetUser, GetAccountIterator, queryAccount, and querySchema. A call for a management task can cause management program 235 to invoke an instance of resource adapter 250 to issue management commands to a resource and receive data back from the resource.

In one embodiment of the present invention, when provisioning engine 305 issues a checkCreateAccount call for a particular resource, it invokes an instance of resource adapter 250. The instance of resource adapter 250 receives a Resource Object and User Object as input from, for example, configuration repository 310 and/or user input through user interface 325. The Resource Object contains the configuration information necessary to communicate with the resource and the User Object contains the account attribute information needed to create a user account on that resource. If, for example, provisioning engine 305 issues a checkCreateAccount call for Unix system 204 (named, for example, "Reso02") to determine if an account can be created for Jane Doe, an instance of resource adapter 250b can load a resource object including the following information:

---

Resource name = "Reso02"
Resource type = "solaris"
Hostname = "resource2.organization.com"
Port = "23"
Protocol = "telnet"
Username = "root"
Password = "********"

---

The configuration information for the Resource Object presented above is exemplary only, and it should be understood that any information used to connect to a resource can be included in a resource object. The User Object can comprise the information necessary to create the account including for example an account name (e.g., janed) and password. Again, these attributes are given by way of example only, and one of ordinary skill in the art would understand which account attributes are necessary to create an account for a given resource.

Based on the checkCreateAccount call, an instance of resource adapter 250b can issue commands to check if connectivity can be established to the resource using the resource object, determine if the account already exists, and determine if the account attribute values in the User Object comply with all the policies of the resource. In one embodiment of the present invention, management program 235 can function similarly when provisioning engine 305 issues a createAccount call for a particular resource to create a user account on a resource. If a createAccounts call is issued, the instance of resource adapter 250 will receive a User Object for each of the accounts to be processed (i.e., a list of user objects) and the instance of resource adapter 250 can iterate over multiple accounts.

In the example above, the account name "janed" was given. However, rather than simply receiving an account name, an instance of resource adapter 250 can, in one embodiment of the present invention, apply one or more identity templates to generate the account name. For resources with flat namespaces, the identity template may simply specify that a default account name should be used. For resources with hierarchical namespaces, the template may be more complicated to allow the full hierarchical names to built. As an example of an identity template for a resource with a hierarchical namespace like LDAP, the account name could be:

$accountID, ou=$department, ou=People, cn=Company, cn=com where "accountID" is, for example, an account name the user already has at management system 230 and department name is the user's department. Identity templates can also allow breaking apart user attributes and combining the pieces (e.g., using the first letter of the first name and first seven characters of second name to create a Unix uid). If a user has accounts on multiple resources, the user's identity on each resource may be the same on none, some or all of the accounts. In one embodiment of the present invention, management program 235 can maintain a mapping between a user's identities and resources to which they correspond in configuration repository 310. U.S. patent application Ser. No. 10/006,089, entitled "System and Method For Managing Information Objects," by inventor Gary Cole, filed Dec. 6, 2001, which is hereby fully incorporated by reference, describes one embodiment of an identity index for maintaining virtual identities.

For the checkDeleteAccount, deleteAccount and deleteAccounts calls as for the checkCreateAccount, createAccount and createAccounts, the instance of resource adapter 250 can function similarly except that it can delete accounts from the resource rather than create accounts. In one embodiment of the present invention, a user's identity on the resource can be used to determine which accounts are deleted.

In addition, for the checkUpdateAccount, updateAccount and updateAccounts calls, the instance of resource adapter 250 can use as inputs a Resource Object specifying the information necessary to connect to the resource and a User Object (or multiple User Objects) specifying the account attributes to updated. Based on the checkUpdateAccount call, the instance of resource adapter 250 can check to determine if connectivity can be established with the resource and whether account attribute values to be updated comply with policies of the resource. In response to the updateAccount or UpdateAccounts calls, the instance of resource adapter 250 can update the account attributes specified in the User Object(s) for one or more accounts on a resource.

An instance of resource adapter 250, in one embodiment of the present invention, can also "discover" user accounts on resources in response to a GetUser call. The instance of resource adapter 250 can use a resource object as input, connect to the resource based on the resource configuration information in the resource object and interrogate the resource to discover users and/or accounts. One embodiment of a system and method for discovery of users and accounts is described in U.S. patent application Ser. No. 10/006,763, entitled "System and Method of Discovering Information," by inventors Jeffrey Larson and Gary Cole, filed Dec. 6, 2001 (the "Discovery Application"), which is hereby fully incorporated by reference. The instance of resource adapter 250 can iterate this process any number of times based on a GetAccountIterator call.

In addition to the management tasks already described, an instance of resource module 250, in one embodiment of the present invention, can issue management commands to request account information based on a queryAccount call. The instance of resource adapter 250 can request and receive a set account information for a set of accounts that match a query expression, thereby enabling the instance of resource adapter module 250 to gather detailed information about accounts, find a set of accounts that match some criteria, or simply list all of the accounts on the resource. The instance of resource adapter 250 can take as input a query expression and a list of account attributes that should be returned along with a resource object for the resource to be queried.

Similarly, an instance of resource adapter 250 can query a schema based on a querySchema call. The instance of resource adapter 250, in one embodiment of the present invention, can use a resource object for the resource to be interrogated and a schema type as inputs. It can then query the resource for its schema according to the schema type and receive a list of the attributes that make up the schema from the resource.

The management tasks described above are given by way of example only, and are not limiting of the present invention. It should be understood that a resource adapter 250 can be programmed to carry out any management task that can be processed in accordance with the software interface of the resource to be managed. For each management task, an instance of resource adapter 250 can return an indication of the success or failure of the task in a result object. In one embodiment of the present invention, if the task failed, there can be a result item in the result object that contains an error message indicating the reason for failure. Logging component 315 can log the results of each task and tracing component 320 can implement tracing to aid in debugging, as would be understood by those of ordinary skill in the art.

Instances of resource adapter 250 can require different resource attributes, which can include information about how the instance of resource adapter 250 will connect to a resource, policies and defaults associated with the resource and how to map the resource's schema to connect to resources and manage accounts and account attributes, which can reflect resource-specific attributes for an information object defined by a resource. Table 1 lists some illustrative examples of resource types and associated resource attributes and account attributes that can be stored in configuration repository 310 for an account management system 230 according to one embodiment of the present invention.

TABLE 1

| Resource Type and Associated Attributes | Description |
| --- | --- |
| LDAP | In one embodiment of the present invention, the LDAP resource adapter can use Java Naming Directory Interface (JNDI) to access an LDAP resource. Moreover the resource adapter can support SASL pluggable authentication. |
| Resource Attributes | |
| Host Name/IP Address | Host name or IP address of the LDAP server |
| Port | The port number on which the LDAP server is listening |
| SSL/TSL | Whether or not the port is for SSL connections |
| Principal | Name resource adapter should use when binding to the LDAP server |
| Credentials | Principal's Base Credentials |
| Base Context | Base Context to which resource adapter should bind |
| Object Classes | The LDAP object classes to use when creating a user account |
| Collection DNs | The distinguished names of LDAP entities that have an attribute to which the distinguished name of the user account entity should be added |
| Collection Member Attribute | The name of the LDAP attribute to which the user distinguished name should be added. This can be a multi-valued attribute. |
| User Member of Attribute | The Name of the User's LDAP attribute to which the collection of distinguished names should be added. This can be a multi-valued attribute |
| Account Attributes | |
| dn | Distinguished name |
| cn | Common name |
| uid | Account name |
| userPassword | Password |
| sn | Surname |
| givenName | First name |
| mail | Email address |
| ORACLE DATABASE Resource Attributes | |
| host | The host name or IP address of the Oracle database server |

TABLE 1-continued

| Resource Type and Associated Attributes | Description |
| --- | --- |
| port | The port used to connect to the Oracle database server |
| database | The database to connect to on the specified server |
| user | The name to use in connecting to the database server |
| password | Password to use when authenticating to the Oracle database |
| Account Attributes | |
| uid | Account name |
| userPassword | Password associated with the uid |
| cn | Common name |
| SQL DATABASE Resource Attributes | |
| host | The host name or IP address of the Oracle database server |
| port | The port used to connect to the Oracle database server |
| database | The database to connect to on the specified server |
| user | The name to use in connecting to the database server |
| password | Password to use when authenticating to the Oracle database |
| Table | The name of the table that will be managed |

The resource types, resource attributes and account attributes listed in Table 1 are given by way of example only. As would be understood by one of ordinary skill in the art, various other resource types, resource attributes and account attributes can be stored in configuration repository 310 depending on the resources to be accessed. Moreover, repository 310 can also store a set of policies and defaults for each resource. As would be understood by those of ordinary skill in the art, each resource can have policies and defaults for things such as account names and passwords. Management program 235 can check the policies and defaults when implementing management tasks.

The account attributes stored in configuration repository 310 can be mapped to resource-specific attributes for a resource using a schema map. For example, if an account attribute listed for an LDAP resource is "givenName," but the resource-specific attribute for a user's first name is "fn," the schema map can map "givenName" to "fn." Thus, the account attribute "givenName" can be a virtual attribute representing the resource-specific attribute "fn." In one embodiment of the present invention, for each resource there can be a single mapping even though some resources might require one or more entries with different schemas (e.g. when there is a distinction between a user and an account in a resource, then there is probably a different schema associated with the user and the account). The schema mapping, in one embodiment of the present invention, can indicate the attributes that are necessary to create an account on the associated resource (e.g., first name, last name, password) and any additional attributes that management system 230 is configured to manage. Additionally, the schema map can contain information regarding whether the attributes associated with schema map should be encrypted.

In addition to mapping account attributes to resource-specific attributes, the schema map can allow the resource-specific attributes to be displayed in a canonical format. A schema map can associate resource-specific information object attributes to a virtual attribute defined in the schema map. In this manner, the schema map can allow management program 235 to display attribute values (i.e., data items) from different resources in a common format in user interface 325.

For example, if Oracle system 202 contains an attribute named "phone" and Unix system 204 contains an attributed named "ph_num," the respective schema maps could map the attributes to a virtual attribute "Phone Number." In one embodiment of the present invention, the values for the viral attribute "Phone Number" need not be stored in configuration repository 310. Instead, when a virtual identity is accessed through user interface 325, management program 235 can call the value for "Phone Number" from Oracle system 202 and/or Unix System 204 (via an instance of resource adapter 250a or 250b) and store the value(s) in RAM, while displaying the values under "Phone Number" in user interface 325, as will be described in greater detail in conjunction with FIG. 5.

In one embodiment of the present invention, the schema map can allow a user to manage his or her accounts through management program 235. In this embodiment of the present invention the user can have a user account on management system 230. Rather than requiring the user to remember an additional passwords in order to manage his or her accounts, management program 235 can have an authentication component 330. The authentication component can invoke an instance of resource adapter 250 to authenticate a user against a user's account on a resource. For example, if a user enters a user name and password in user interface 320 to access his or her management account, the schema map can map these attributes to the user's user name and password on Unix system 204.

Figure 4:
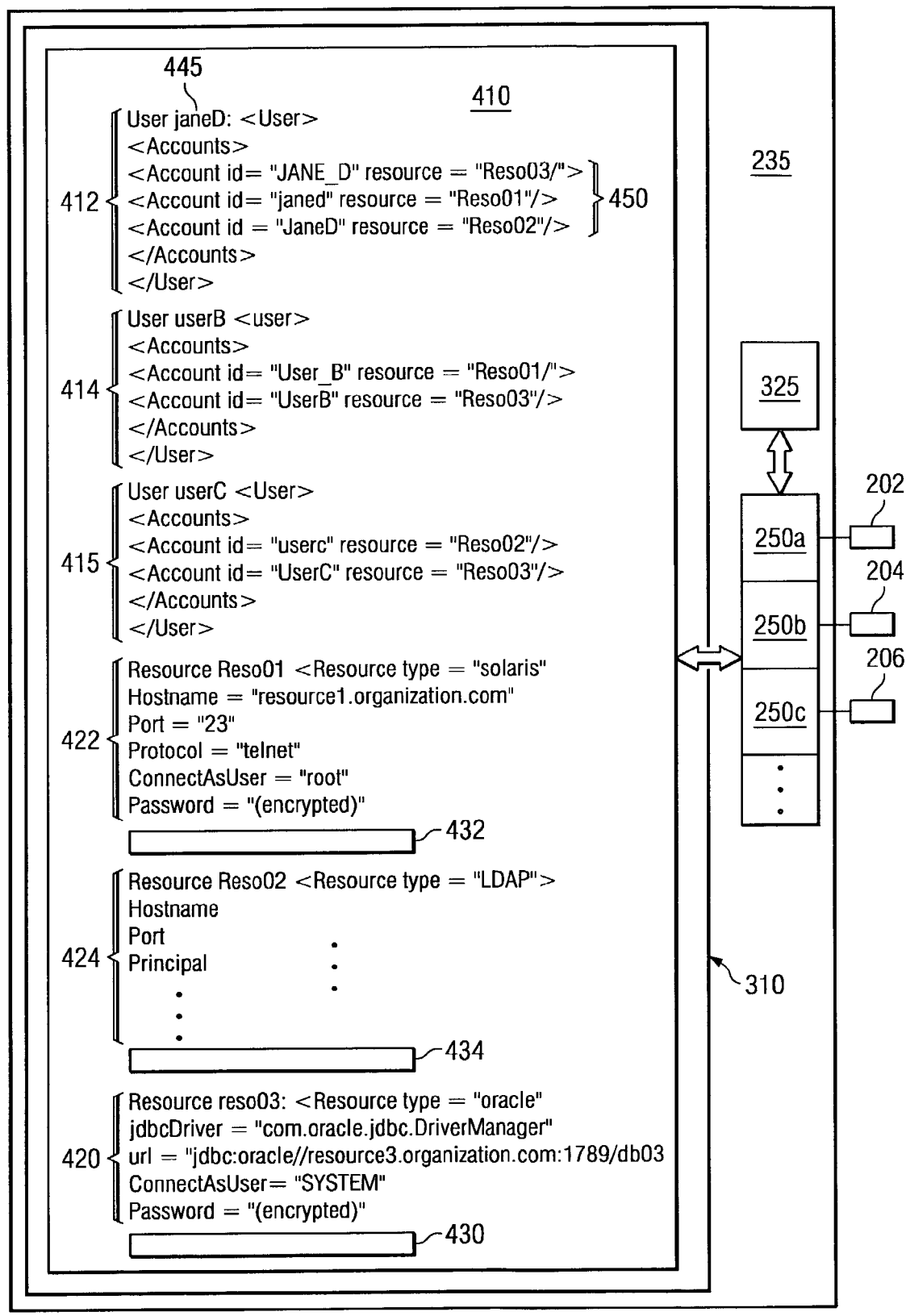
FIG. 4 is a diagrammatic representation of an embodiment of a system for resource management utilizing an identity index according to one embodiment of the present invention.

FIG. 4 is a diagrammatic representation of a management architecture 400 for managing user accounts according to one embodiment of the present invention. Management architecture 400 can comprise management program 235 for managing user accounts, a configuration repository 310 to store resource and account attributes. In one embodiment of the present invention, management program 235 can invoke and instance of resource adapters 250 (such as resource adapter 250a, resource adapter 250b or resource adapter 250c) to communicate with Oracle database system 202, first Unix system 204 or LDAP system 206.

In the embodiment illustrated in FIG. 4, configuration repository 310 can store resource attributes and account attributes in an identity index 410 that can contain a number of virtual identities (e.g., virtual identities 412, 414 and 415). The virtual identities 412, 414 and 415 can be created by management program 235 based on users discovered on the resources by management program 235 as discussed in the Discovery Application, or they can be independently created (e.g., by an administrator). Each virtual identity 412, 414 and 415 can contain a virtual identity name 445 and a list of resource accounts 450 associated with the user corresponding to the virtual identity. For example, if employee Jane Doe has an account on Oracle database system 202, first Unix system 204 and LDAP system 206, the native key for those accounts (e.g., the account ID) and the resource on which those accounts are located can be stored in Jane Doe's virtual identity. Additional resource attributes can be stored in a virtual identity depending on the configuration of system 400 (e.g., if the organization wishes the capability to search identity index 410 by user name, they may want to store attributes such as "firstname," "lastname," or "fullname"). In one embodiment of the present invention, information from one or more of the virtual attributes stored in the virtual identity can be loaded as part of a user object by an instance of resource adapter 250 and be mapped to resource-specific attributes using the schema map that can be part of the resource attributes, as discussed below.

Additionally, identity index 410 can include a set of resource definitions, such as resource definitions 420, 422, and 424 containing a set of resource attributes. In FIG. 3, resource definition 420 corresponds to Oracle database system 202, resource definition 422 corresponds to first Unix system 204 and resource definition 424 corresponds to LDAP system 206. Each resource definition can contain the information needed by management program 235 to connect to the corresponding resource.

Each resource definition can further include a schema map. For example, resource definition 420 can include schema map 430, resource definition 422 can include schema map 432, and resource definition 424 can include schema map 434. As described above, schema map associates resource-specific information object attributes to a virtual attribute or account attribute defined in the schema map. In this manner, the schema map allows management program 235 to display attributes values (i.e. data items) from different resources in a common format in user interface 325. For example, resource-specific attributes from different resources can be mapped to the same virtual attribute. Thus for example, if Oracle database system 210 contained an attribute named "phone" and first Unix system 212 contained an attribute name "ph_num," schema maps 430 and 432 could, respectively, map the attributes to a virtual attribute named "Phone Number."

Figures 1, 5:
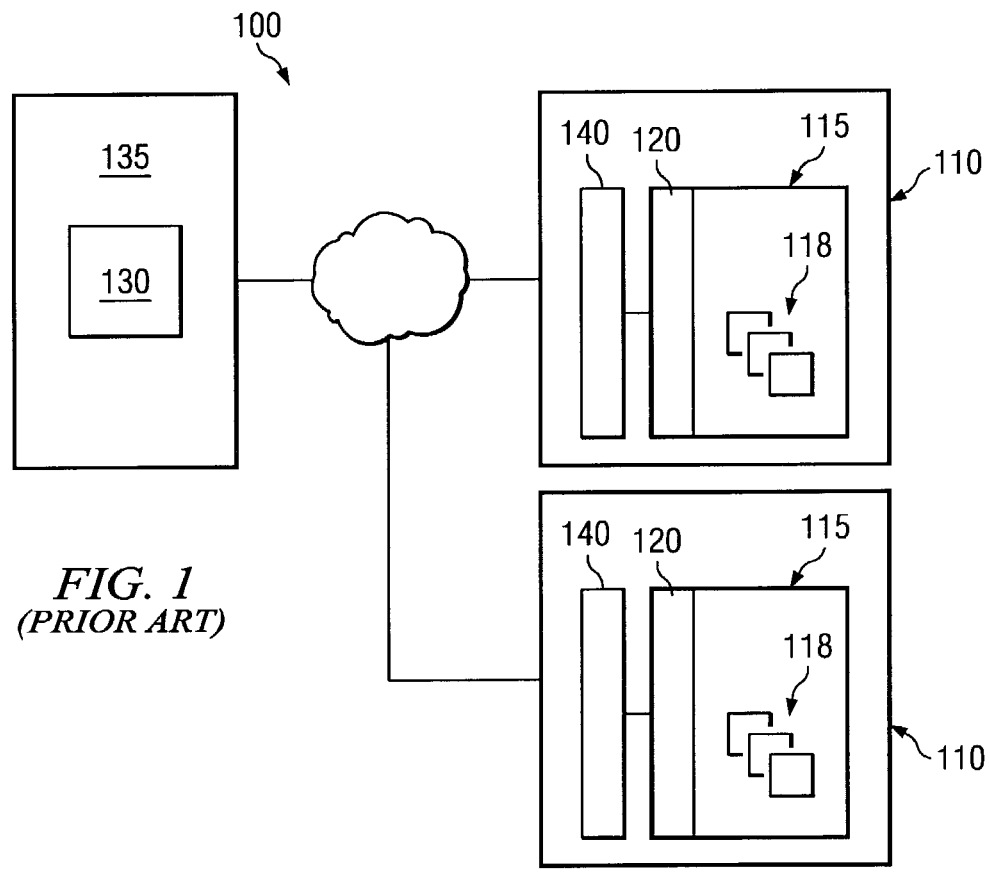
FIG. 1 illustrates a prior art system of resource management utilizing agent technology.
FIG. 5 is a diagrammatic representation of a schema map according to one embodiment of the present invention.

In one embodiment of the present invention, the values for the virtual attribute "Phone Number" are not be stored in identity index 410. Instead, when a user or administrator accesses the user's virtual identity, software program 235 can access the attributes "ph_num" and "phone" (from resources 202 and 204, respectively), store the values in RAM (e.g., construct a virtual information object) and display the values under "Phone Number" in user interface 325. If the values match, user interface 325 can display only one value (in a graphical user interface, for example), or if the values do not match, the user or administrator can be given the option to select the correct value. Furthermore, if a user makes a change to a virtual attribute associated with a user, the change can be pushed out to the appropriate resource-specific attributes by an instance of resource adapter 250 based on the schema maps. The schema maps, thus, provide a way to represent resource-specific attributes in a standard or canonical format (i.e. to construct a virtual information object) and to map changes back to resource specifications. FIG. 5 illustrates one embodiment of a schema map.

Management program 235 can generate a composite view of a user's accounts as defined by a schema map. Based on the schema map(s), the composite view can contain virtual attribute values derived from the resource-specific attributes for a user and can be presented to users through a graphical user interface. The organization implementing system 400 can determine various levels of authority for administrators and users to view and or modify certain virtual attributes. Thus, user interface 325 may display different information to a user or administrator depending on his or her status. When a user or administrator modifies the value for a virtual attribute, management program 235 can invoke one or more instances of resource adapter 250 to push the change to the virtual attribute to the resource-specific attributes associated with the modified attribute in the schema map. Thus, data across resources can be synchronized without replicating the attributes at a central database and without requiring the use of separate agents at each resource.

FIG. 5, illustrates one embodiment of a schema map (e.g., schema map 430 of FIG. 4). A schema map for a particular resource, such as schema map 430, can contain a virtual attribute 510 (e.g., an account attribute), resource-specific attribute 520 and an attribute type 530. In the example of FIG. 4, one account attribute 510 is "Phone Number," whereas the corresponding resource-specific attribute 520 is "phone." When an instance of resource adapter 250 receives the resource-specific attribute "phone" from a resource in response to a management command associated with a user's resource account, the instance of resource adapter 250 can map the value for "phone" to the virtual attribute "Phone Number" for the user's virtual identity. It should be noted that the value for "Phone Number" might not be saved in nonvolatile memory (e.g., with identity index 410), but may instead only be saved in RAM while the virtual identity is being manipulated or created.

In schema map 430, attribute type 530 can comprise "string" and "Boolean" or other possible attribute types as would be understood by those of ordinary skill in the art. The attribute type 530 field can be used to map different types of attributes together. It should be noted that in some embodiments of the present invention, not every resource-specific attribute will be mapped to a virtual attribute. In one embodiment of the present invention, these unmapped attributes will typically not be displayed in user interface 325, identity index 410 or schema map 430. It should be further noted that if all instances of a resource type are the same, a schema map can be defined for a resource type rather than on a resource by resource basis. As such, there could be one schema map for NT systems, on schema map for Unix, one schema map for LDAP and so on. However, in many cases an organization may configure the same resource type in several ways. For example, an organization may store different types of data in an NT systems "description" field on different NT systems. In this case, each NT system can require a unique schema map.

Figure 6:
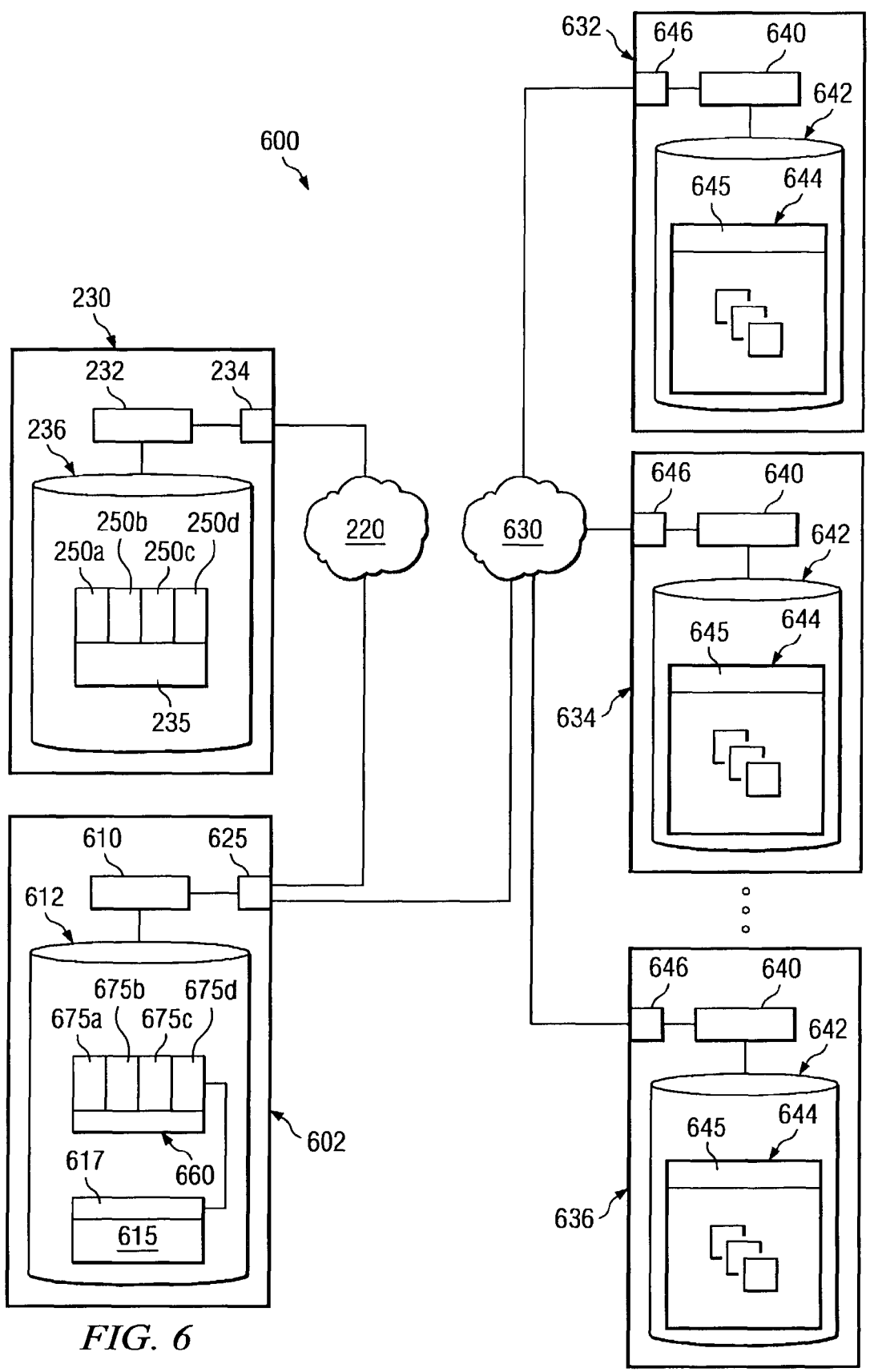
FIG. 6 is a diagrammatic representation of an embodiment of a system for resource management using a gateway according to one embodiment of the present invention.

FIG. 6 is a diagrammatic representation of a tiered system 600 in which one embodiment of the present invention can be utilized to manage information objects on resources. Tiered system 600 can comprise a management system 230 further comprising management computer processor 232, a management network communications device 234 (e.g., modem, Ethernet card or any other network communications device known in the art) operable to connect to network 220, and a management program 235 stored on computer readable memory 236 (e.g., RAM, ROM, magnetic storage device, optical storage device and/or any other computer-readable memory known in the art) and a gateway system 602 comprising a gateway computer processor 610, a gateway system computer-readable memory 612 (e.g., RAM, ROM, magnetic storage device, optical storage device and/or any other computer-readable readable memory known in the art) storing a gateway resource program 615. Gateway system 602 can also comprise a gateway network communications device 625 (e.g., modem, Ethernet card or any other network communications device known in the art) operable to connect to network 220 and second network 630, each of which can comprise a LAN, WAN, global communications network (e.g., Internet, wireless network, fiber channel network) or any other communications network known in the art. Gateway program 615 can provide a gateway program interface 617.

System 600 can also comprise a number of resources (here, resource 632, 634 and 636) located behind gateway system 602 relative to network 220. Each resource can comprise a computer processor 640, a resource system computer-readable memory 642 (e.g., RAM, ROM, magnetic storage device, optical storage device and/or any other computer-readable memory known in the art), storing a resource program 644 with an interface 645, and a resource network adapter 646 (e.g., modem, Ethernet card or any other network communications device known in the art) operable to connect to network 630. In one embodiment of the present invention network 220 can comprise the Internet, while network 630 can comprise a LAN. In this embodiment of the present invention, gateway system 602 acts as a gateway between the resources on LAN 630 and systems connected to Internet 220. A system such as that illustrated in FIG. 6 can be implemented by, for example, an organization wishing to control access to resource 632-636 from the Internet for security reasons.

In some cases, resources 632-636 can have a software interface 645 that allows remote management as described above. In other cases, the software interface 645 may not allow remote management or remote management may be less efficient. As an example of this, if resources 632, 634, 636 and gateway system 602 run using a Windows®NT active directory structure, it may be difficult to issue commands from outside of LAN 630 to resources 632-636. Although most active directory systems have an LDAP interface, it may be more efficient to use an Active Directory Service Interface ("ADSI"), which, as would be understood by those of ordinary skill in the art, does not typically support access outside of the LAN. However, the resources may support remote access from within LAN 630. In such a case, gateway system 602 can include a gateway management program 660 to interface with gateway resource program 615 and/or resources 632-636. Gateway management program 660 can, in one embodiment of the present invention, receive management calls from outside of LAN 630 and issue management commands within LAN 630, typically without requiring additional software to installed on the resources (e.g., resource 632, resource 634 or resource 636) other than gateway system 602.

To manage the resources of system 600, one embodiment of management program 235 can invoke an instance of a resource adapter 250 to issue one or calls to gateway management program 660. At invocation, the instance of resource adapter 250 can use a resource object containing the information necessary to connect to gateway management program 660 (e.g., host, port, IP address) and information necessary to access gateway resource program 615 (e.g. domain, user name for logging onto the domain, password, etc.) in accordance with interface 617. Additionally, the instance resource adapter 250 can load a user object containing a set of account attributes (e.g. account name, password, etc.). Table 2 represents exemplary resource and account attributes for Windows®NT domains and Active Directory systems. The attributes in Table 2 are provided by way of example only.

TABLE 2

| RESOURCE TYPE AND ATTRIBUTES | COMMENTS |
| --- | --- |
| WINDOWS ® NT | Windows ® NT can present both a LDAP and ADSI interface. The properties given here are for an ADSI interface, which is extensible to Active Directory. |
| Resource Attributes | |
| Gateway Management Program Information | Includes the hostname or IP address of the NT machine on which the gateway management program is running and the port over which it is listening. |
| Domain | The name of the Domain in which the accounts are to be managed |

TABLE 2-continued

| RESOURCE TYPE AND ATTRIBUTES | COMMENTS |
| --- | --- |
| User Name | The name the gateway management program should use when logging into the domain |
| Password | The password the gateway management program should use when logging into the domain. |
| Account Attributes | |
| uid | Account name |
| cn | Common name |
| description | |
| AccountDisabled | |
| AccountExpirationDate | |
| LoginWorkstations | |
| MaxLogins | |
| MaxStorage | |
| PasswordExpirationDate | |
| PasswordMinimumLength | |
| PasswordRequired | |
| HomeDirectory | |
| Profile | |
| Loginscript | |
| Password | |

The instance of resource adapter 250 can communicate the resource attributes necessary to access gateway resource program 615 and the account attributes, along with management commands or command calls, to gateway management program 660. It should be noted that all the information in the resource object or user object may be passed to gateway management program 660 or only the portion needed by gateway management program 660 needed to interface with gateway resource program 615. In another embodiment of the present invention, at least a portion of the resource objects and user object can be stored at gateway system 602. Gateway management program 660 can invoke an instance of gateway resource adapter 675 to generate management commands in accordance with interface 617 based on a management call received from the instance of resource adapter 250. Gateway resource adapter 675 can then pass any data received from gateway resource program 615 back to management system 230.

In addition to managing gateway system 602, gateway management program 660 can invoke one or more instances of gateway resource adapter 675 to manage resources 632, 634 and 636. As with resource adapter 250, one gateway resource adapter 675 is typically operable to communicate with a particular resource type with an instance of that gateway resource adapter being invoked when management program 235 issues a management command to a resource of the associated resource type.

In operation, management program 235 can invoke an instance of resource adapter 250d to communicate management calls to gateway system 602. The instance of resource adapter 250d can load a set of information necessary to communicate with gateway management program 660, a set of resource attributes necessary to communicate with a target resource (i.e. the resource to be managed) and a set of account information (e.g. a User Object) containing information regarding the account(s) to be managed. The instance of resource adapter 250d can establish a connection with gateway management program 660 and pass the resource object, user object and management call to gateway management program 660. Gateway management program 660 can then invoke an instance of gateway resource adapter 675 (e.g. gateway resource adapter 675b) to generate a management command in accordance with software interface 645 of the resource program 644 to be managed. The instance of gateway resource adapter 675 can establish a connection to the target resource using the information from the resource object and manage an account based on the information in the user object. By way of example but not limitation, an instance of resource adapter 675 can implement management tasks including: checkCreateAccount, createAccount, createAccounts, checkUpdate account, updateAccount, updateAccounts, checkDeleteAccount, deleteAccount, deleteAccounts, GetUser, GetAccountIterator, queryAccount, and querySchema, each of which was discussed in conjunction with FIG. 3.

Although, in system 600, a gateway management program 660 is deployed on gateway system 602, the system of 600 still provides advantages over the prior art because a separate agent does not have to be deployed on each of the managed resources (e.g., resource 632, resource 634 or resource 636). This allows four resources to be managed through one locally installed management software component (e.g., gateway management program 660), rather than four separate agents. Because only one management software component is installed on the resources of LAN 630, the present invention can decrease the time of deployment for management software, reduce costs, and ease the burden of updating the management software by reducing the number of separate updates to be made.

It should be noted that while, in FIG. 6, there is a gateway resource program 615 to be managed on gateway system 602, in another embodiment of the present invention, there may be no gateway resource program 615 and gateway management program 660 may simply manage the resources behind gateway system 602. Thus, embodiments of the present invention can manage a number of resources behind a gateway without a portion of the management program installed on the resources. In yet another embodiment of the present invention, there can be no resources behind gateway system 602 and gateway management program 660 may only manage gateway system 602. In this embodiment of the present invention, gateway management program 660 can comprise a custom management program for managing gateway resource program 615.

Figure 7:
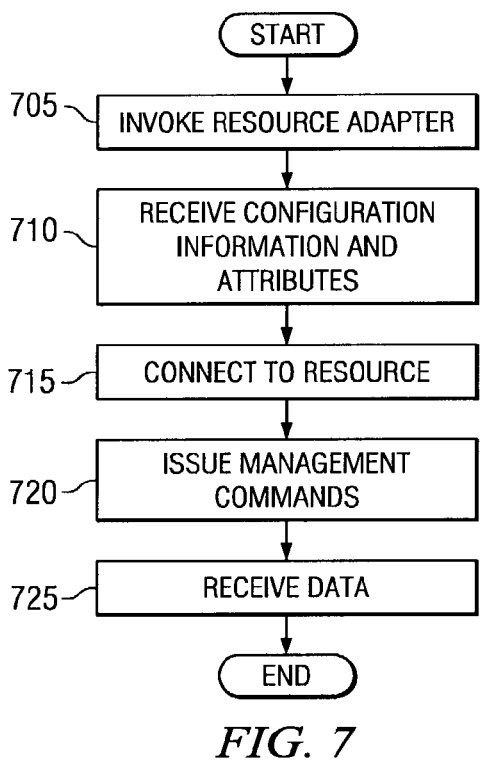
FIG. 7 is a flowchart illustrating one embodiment of a method of resource management according to the present invention.

FIG. 7 is a flow chart illustrating a method for managing information objects according to one embodiment of the present invention. At step 705, management program 235 can invoke an instance of resource adapter 250 to carry out a management task. This can be done based on user input (e.g. through user interface 325), a predetermined schedule and/or other prompts. At step 710, the instance of resource adapter 250 can receive a set of resource configuration information (e.g. a resource object) and account attributes (e.g. a user object) from configuration repository 310 and/or user provided information (e.g. from user interface 325) and, at step 715, can establish a connection to the resource based on resource configuration information in accordance with the interface of the resource. The instance of resource adapter 250 can then issue one or more management commands (step 720) in accordance with the interface for the resource in order to carry out a management task, such as createAccounts. The instance of resource adapter 250 can further receive data from the resource in response to the management commands (step 725). In one embodiment of the present invention steps 705-725 can be repeated.

Figure 8:
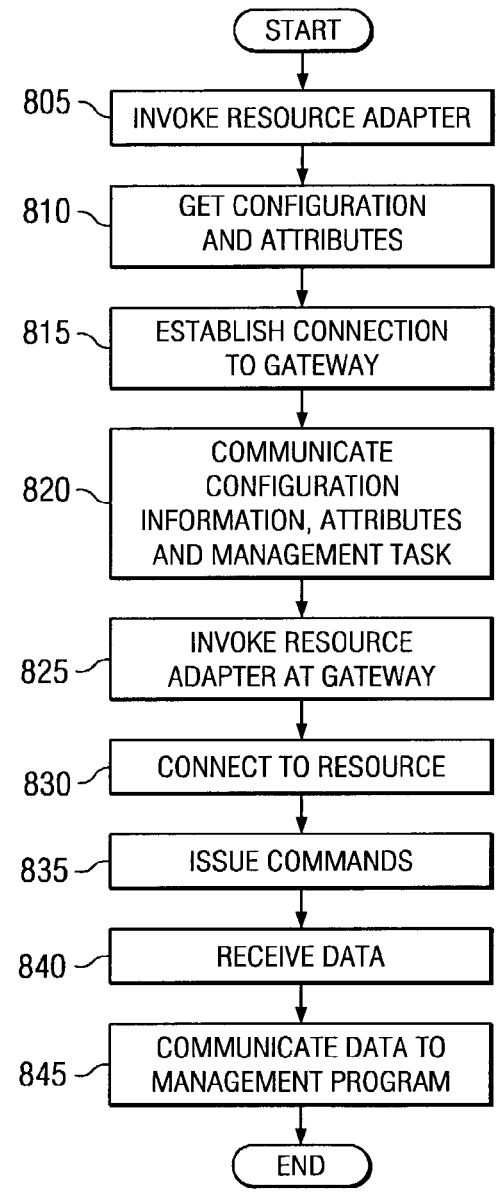
FIG. 8 is a flowchart illustrating another embodiment of a method of resource management according to the present invention.

FIG. 8 is a flow chart illustrating a method for managing information objects according to another embodiment of the present invention. At step 805, management program 235 can invoke an instance of resource adapter 250 to carry out a management task. This can be done based on user input (e.g. through user interface 325), a predetermined schedule or other prompt. At step 810, the instance of resource adapter 250 can receive a set of resource configuration information for a gateway system and set of resource configuration information for a target resource (e.g. as part of a single or multiple resource objects) and account attributes (e.g. a user object) from configuration repository 310 and/or user provided information (e.g. from user interface 325).

At step 815, the instance of resource adapter 250 can establish a connection to gateway system 602 based on the resource configuration information in accordance with the interface of gateway management program 660. The instance of resource adapter 250 can then communicate the management call along with the configuration information for the target resource and the account information to gateway management program 660 (step 820). At step 825, gateway management program 660 can invoke an instance of gateway resource adapter 675 to communicate with the target resource. Using the target resource configuration information received from the instance of resource adapter 250, the instance of gateway resource adapter 675 can establish a connection with the target resource (step 830) in accordance with the software interface 645 for the target resource. The instance of gateway resource adapter 675 can then issue one or more management commands (step 835) in accordance with the interface for the target resource in order to carry out a management task, such as createAccounts. The instance of resource adapter 675 can further receive data from the resource in response to the management commands (step 840) and communicate the received data to management program 235 (step 845). Steps 805-845 can be repeated.

Embodiments of present invention provide a system and method to manage resources with decreased dependence on local agent technology. Embodiments of the present invention can leverage software interfaces at managed resources to carryout management tasks over a network, generally without the use of local agents. This provides advantages over prior art systems by reducing the number of executable programs that must be deployed on a system, thereby increasing overall system stability and substantially cutting deployment time. Moreover, since management can be carried out by a centralized management program, in one embodiment of the present invention, fewer programs must be updated when new functionality is added to one or more of the managed resources.

One embodiment of the present invention includes a management system having a management computer processor, a management computer network communications device electrically connected to said management computer processor, in communication with a network, a management computer-readable memory electrically connected to said management computer processor and a management program stored on said management computer memory, executable by said management computer processor to: (i) communicate with a resource according to the software interface for the resource; (ii) generate a management command; and (iii) communicate the management command to the resource over a network in accordance with the software interface for the resource. In one embodiment of the present invention, the management program can invoke an instance of a resource adapter to communicate with and manage a resource. In this manner, embodiments of the present invention can manage remote resources without a software agent installed at the remote resource.

Another embodiment of the present invention can comprise a tiered architecture comprising a management system having a management computer processor, a management computer network communications device electrically connected to said management computer processor, in communication with a network, a management computer-readable memory electrically connected to said management computer processor and a management program stored on said management computer memory, executable by said management computer processor to: (i) communicate with a gateway management program according to the software interface for the resource and (ii) communicate a management call and a set of configuration information for the target resource to the gateway management program. The gateway management program can be further executable by a gateway computer processor to (i) communicate with a target resource according to the software interface for the resource; (ii) generate a management command; and (iii) communicate the management command to the target resource over a network in accordance with the software interface for the target resource.

Yet another embodiment of the present invention can include a method for resource management comprising (i) communicating with a resource program over a network according to said resource program's software interface; (ii) generating a resource management command remote from said resource to perform a management task; and (iii) communicating said resource management command over said network to said resource in accordance with said resource program's software interface to manage an information object at said resource.

An additional embodiment of the present invention can include a method of resource management comprising (i) receiving a prompt to initiate a management task over a network; (ii) receiving a set of resource configuration information over said network; (iii) communicating with a resource program over said network according to said resource program's software interface and said set of resource configuration information; (iv) generating a resource management command to perform said management task; and (v) communicating said resource management command over said network to said resource computer in accordance with said resource program's software interface to manage an information object on said resource.

Although the present invention has been described in detail herein with reference to the illustrative embodiments, it should be understood that the description is by of example only and is not to be construed in a limiting sense. It is to be further understood, therefore, that numerous changes in the details of the embodiments of this invention an additional embodiments of this invention will be apparent to, and may be made by, persons of ordinary skill in the art having reference to this description. It is contemplated that all such changes and additional embodiments are with the scope of this invention as claimed below.

What is claimed is:

1. A system of resource management, comprising:
   a management computer comprising a plurality of resource adapters, wherein during operation each one of the plurality of resource adapters communicates directly with a respective management interface associated with a particular resource type, wherein the respective management interface operates according to a communication protocol that is dependent on the particular resource type, and wherein each one of the plurality of resource adapters communicates via a different communication protocol; and
   one or more resource computers, wherein each one of the one or more resource computers is located remotely from the management computer, wherein the one or more resource computers comprise a plurality of resources, wherein at least two of the plurality of resources are of different resource types, and wherein during operation, each of the plurality of resources:
      receives a resource management command from the management computer; and
      manages an information object based on the received resource management command, wherein the information object comprises user account information for one or more user accounts that have access to the resource;
   wherein the management computer stores a management program that, when executed:
      generates a resource management command to perform a management task on a selected resource of the plurality of resources implemented on the one or more resource computers;
      selects a corresponding one of the plurality of resource adapters as a selected resource adapter dependent on a resource type of the selected resource;
      invokes an instance of the selected resource adapter, wherein the invoked instance of the selected resource adapter, during operation, communicates directly with a management interface of the selected resource; and
      communicates the generated resource management command, via the invoked instance of the selected resource adapter, to the management interface of the selected resource to manage an information object of the selected resource;
      wherein the invoked instance of the selected resource adapter is configured to load a set of resource configuration information.

2. The system of claim 1, wherein said resource configuration information further comprises a set of resource attributes necessary to communicate with the management interface of the selected resource.

3. The system of claim 2, wherein said resource configuration information further comprises a schema map for said selected resource.

4. The system of claim 3, wherein said resource configuration information further comprises a policy for managing said selected resource.

5. The system of claim 1, wherein the invoked instance of the selected resource adapter loads a user object comprising virtual attributes associated with said one or more user accounts.

6. The system of claim 5, wherein said user object further comprises a set of account attributes.

7. The system of claim 1, wherein said user account information comprises a set of account attributes.

8. The system of claim 7, wherein the invoked instance of the selected resource adapter loads a user object comprising said set of account attributes.

9. The system of claim 8, wherein said resource configuration information further comprises a schema map for said selected resource, said schema map mapping said account attributes to a set of resource-specific attributes defining said one or more user accounts at said selected resource.

10. The system of claim 8, wherein said management task comprises a Create Account task and said user object comprises information needed to create an account at said selected resource.

11. The system of claim 8, wherein said user object is based on an identity template.

12. The system of claim 8, wherein said management task comprises a Get User task.

13. The system of claim 12, wherein the invoked instance of the selected resource adapter executes said Get User task to retrieve account information for a user.

14. The system of claim 1, wherein said management computer further comprises a provisioning engine portion that invokes the selected resource adapter to issue said generated resource management command.

15. The system of claim 14, wherein said provisioning engine portion invokes multiple instances of the selected resource adapter to issue multiple generated resource management commands to the management interface of the selected resource.

16. The system of claim 1, wherein said management computer further comprises a configuration repository executable to store a set of resource attributes.

17. The system of claim 16, wherein said configuration repository is further executable to store a set of account attributes.

18. A system of resource management, comprising:
   a gateway management computer comprising a plurality of resource adapters, wherein during operation each one of the plurality of resource adapters communicates directly with a respective management interface associated with a particular resource type, wherein the respective management interface operates according to a communication protocol that is dependent on the particular resource type, and wherein each one of the plurality of resource adapters communicates via a different communication protocol;
   a management computer; and
   one or more resource computers, wherein each one of the one or more resource computers is located remotely from the management computer, wherein the one or more resource computers comprise a plurality of resources, wherein at least two of the plurality of resources are of different resource types, and wherein, during operation, each of the plurality of resources:
      receives a resource management command;
      manages an information object based on the received resource management command, wherein the information object comprises user account information for one or more user accounts that have access to the resource; and
      communicate reply data in response to the received resource management command;
   wherein the gateway management computer stores a management program that, when executed:
      receives a management call;
      receives a set of resource configuration information;
      receives a set of information object attributes;
      generates a resource management command to perform a management task on a selected resource of the plurality of resources;
      selects a corresponding one of the plurality of resource adapters as a selected resource adapter dependent on a resource type of the selected resource;
      invokes an instance of the selected resource adapter, wherein the instance of the selected resource adapter, during operation, communicates directly with a management interface of the selected resource;
      communicates the generated resource management command, via the invoked instance of the selected resource adapter, to the management interface of the selected resource to manage an information object of the selected resource;
      receives, via the invoked instance of the selected resource adapter, the reply data from the management interface of the selected resource; and
      communicates the reply data to the management computer;
   wherein during operation the management computer:
      generates the management call to perform the management task;
      communicates the management call to the gateway management computer;
      communicates at least a portion of the set of resource configuration information to the gateway management computer; and
      communicates at least a portion of the set of information object attributes to the gateway management computer;
   wherein said management computer is further configured to load said set of resource configuration information.

19. The system of claim 18, wherein said set of resource configuration information comprises a set of resource attributes necessary to communicate with the management interface of the selected resource.

20. The system of claim 19, wherein said set of resource configuration information further comprises a schema map for said information object of the selected resource.

21. The system of claim 19, wherein said information object attributes comprise a user account defined by a set of account attributes.

22. The system of claim 20, wherein said schema map for said information object of the selected resource maps a set of account attributes to a set of resource-specific attributes defining said user account at the selected resource.

23. A system of resource management comprising a management software program stored on a non-transitory computer readable medium and executable by a computer processor to:
   generate a resource management command, wherein the resource management command comprises instructions for a resource to perform a management task;
   select a corresponding one of a plurality of resource adapters as a selected resource adapter dependent on a resource type of the resource, wherein during operation each one of the plurality of resource adapters communicates directly with a respective management interface associated with a particular resource type, wherein the respective management interface operates according to a communication protocol that is dependent on the particular resource type, and wherein each one of the plurality of resource adapters communicates via a different communication protocol;
   invoke an instance of the selected resource adapter, wherein the invoked instance of the selected resource adapter, during operation, communicates directly with a management interface of the resource; and
   communicate said resource management command, via the invoked instance of the selected resource adapter, over a network to the management interface of the resource to manage an information object, wherein the information object comprises user account information for one or more user accounts that have access to the resource;
   wherein the invoked instance of the selected resource adapter is configured to load a set of resource configuration information.

24. The system of claim 23, wherein the management software program is executable by the computer processor to communicate said resource management command to the management interface of the resource based on said resource configuration information.

25. The system of claim 24 wherein said resource configuration information further comprises a set of resource attributes necessary to communicate with the management interface of the resource.

26. The system of claim 25, wherein said resource configuration information further comprises a schema map for said information object.

27. The system of claim 24, wherein the invoked instance of the selected resource adapter loads a set of virtual attributes associated with said information object.

28. The system of claim 24, wherein said user account information comprises a set of account attributes.

29. The system of claim 28, wherein the invoked instance of the selected resource adapter loads a user object comprising said set of account attributes.

30. The system of claim 23, wherein the management interface of the resource is standards-based.

31. A system of resource management comprising a gateway management program stored on a non-transitory computer readable medium and executable by a computer processor to:
  receive a prompt to initiate a management task over a network;
  receive a set of resource configuration information over said network;
  generate a resource management command, wherein the resource management command comprises instructions for a resource to perform said management task;
  select a corresponding one of a plurality of resource adapters as a selected resource adapter dependent on a resource type of the resource, wherein during operation each one of the plurality of resource adapters communicates directly with a respective management interface associated with a particular resource type, wherein the respective management interface operates according to a communication protocol that is dependent on the particular resource type, and wherein each one of the plurality of resource adapters communicates via a different communication protocol;
  invoke an instance of the selected resource adapter wherein the invoked instance of the selected resource adapter, during operation, communicates directly with a management interface of the resource; and
  communicate said resource management command, via the invoked instance of the selected resource adapter, over said network to the management interface of the resource to manage an information object, wherein the information object comprises user account information for one or more user accounts that have access to the resource;
  wherein said invoked instance of the selected resource adapter is configured to receive a user object comprising a set of account attributes.

32. The system of claim 31, wherein said user account information comprises the set of account attributes.

33. The system of claim 31, wherein said gateway management program is further executable to receive a set of reply data from the management interface of the resource and communicate said set of reply data to a centralized management program.

34. The system of claim 31, wherein the management interface of the resource is standards-based.

35. A method for resource management, comprising:
  performing by a computing device:
    generating a resource management command, wherein the resource management command comprises instructions for a resource to perform a management task;
    selecting a corresponding one of a plurality of resource adapters as a selected resource adapter dependent on a resource type of the resource, wherein during operation each one of the plurality of resource adapters communicates directly with a respective management interface associated with a particular resource type, wherein the respective management interface operates according to a communication protocol that is dependent on the particular resource type, and wherein each one of the plurality of resource adapters communicates via a different communication protocol;
    invoking an instance of the selected resource adapter, wherein the invoked instance of the selected resource adapter communicates directly with a management interface of the resource; and
    communicating the resource management command, via the invoked instance of the selected resource adapter, over a network to the management interface of the resource to manage an information object managed by the resource, wherein the information object comprises user account information for one or more user accounts that have access to the resource.

36. The method of claim 35, further comprising:
  loading a set of resource configuration information; and
  communicating with said resource based on said set of resource configuration information and the management interface of said resource.

37. The method of claim 36, further comprising storing a schema map in said set of resource configuration information.

38. The method of claim 36, further comprising loading a set of virtual attributes associated with said information object.

39. The method of claim 36, wherein said user account information comprises a set of account attributes.

40. The method of claim 39, wherein the one of the plurality of resource adapters is further executable to load a user object comprising said set of account attributes.

41. The method of claim 35, wherein the management interface of the resource is standards-based.

42. A method of resource management comprising:
  performing by a computing device:
    receiving a set of resource configuration information over a network;
    generating a resource management command, wherein the resource management command comprises instructions for a resource to perform a management task;
    selecting a corresponding one of a plurality of resource adapters as a selected resource adapter dependent on a resource type of the resource, wherein during operation each one of the plurality of resource adapters communicates directly with a respective management interface associated with a particular resource type, wherein the respective management interface operates according to a communication protocol that is dependent on the particular resource type, and wherein each one of the plurality of resource adapters communicates via a different communication protocol;
    invoking an instance of the selected resource adapter, wherein the invoked instance of the selected resource adapter, wherein the invoked instance of the selected resource adapter communicates directly with a management interface of the resource; and communicating, via the invoked instance of the selected resource adapter, said resource management command over said network to the management interface of the resource to manage an information object on said resource, wherein the information object comprises user account information for one or more user accounts that have access to the resource.

43. The method of claim 42, wherein said user account information comprises a set of account attributes.

44. The method of claim 42, further comprising receiving a user object comprising a set of account attributes.

45. The method of claim 44, further comprising receiving a set of reply data from the management interface of the resource and communicating, via the invoked instance of the selected resource adapter, said set of reply data to a centralized management program.

46. The method of claim 44, wherein the resource management command indicates a Get User task.

47. The method of claim 44, wherein the resource management command indicates a Create Account task.

48. The method of claim 44, wherein the management interface of the resource is standards-based.

* * * * *

UNITED STATES PATENT AND TRADEMARK OFFICE
CERTIFICATE OF CORRECTION

PATENT NO. : 8,768,715 B2
APPLICATION NO. : 10/319801
DATED : July 1, 2014
INVENTOR(S) : Penick It is certified that error appears in the above-identified patent and that said Letters Patent is hereby corrected as shown below:

On the title page, column 2, item (56) under Other Publications, line 10, delete "Managemet" and insert -- Management --, therefor.

On title page 2, column 1, item (56) under Other Publications, line 1, delete "Ontegration" and insert -- Integration --, therefor.

In the Specification

In column 13, Line 57, delete "and or" and insert -- and/or --, therefor.

Signed and Sealed this
Third Day of March, 2015

Michelle K. Lee
*Deputy Director of the United States Patent and Trademark Office*